(12) United States Patent
Yoshida et al.

(10) Patent No.: US 8,051,729 B2
(45) Date of Patent: Nov. 8, 2011

(54) SCREW DEVICE AND METHOD OF MANUFACTURING THE SAME

(75) Inventors: Akimasa Yoshida, Tokyo (JP);
Masakazu Uesugi, Tokyo (JP); Kentaro Nishimura, Tokyo (JP); Satoshi Fujita, Kyoto (JP); Satoru Nagai, Tokyo (JP); Hiroyuki Arai, Tokyo (JP)

(73) Assignee: THK Co., Ltd., Tokyo (JP)

( * ) Notice: Subject to any disclaimer, the term of this patent is extended or adjusted under 35 U.S.C. 154(b) by 502 days.

(21) Appl. No.: 11/917,592

(22) PCT Filed: Jun. 16, 2006
(Under 37 CFR 1.47)

(86) PCT No.: PCT/JP2006/312096
§ 371 (c)(1),
(2), (4) Date: Apr. 24, 2009

(87) PCT Pub. No.: WO2006/135038
PCT Pub. Date: Dec. 21, 2006

(65) Prior Publication Data
US 2009/0301246 A1 Dec. 10, 2009

(30) Foreign Application Priority Data
Jun. 17, 2005 (JP) .................. 2005-177419

(51) Int. Cl.
*F16H 29/20* (2006.01)
*F16H 1/24* (2006.01)
(52) U.S. Cl. .................. 74/89.42; 74/424.81
(58) Field of Classification Search .......... 74/89.42, 74/409, 441, 424.71, 424.81, 424.82, 424.84, 74/424.88, 424.91
See application file for complete search history.

(56) References Cited

U.S. PATENT DOCUMENTS
3,638,507 A 2/1972 Orner
(Continued)

FOREIGN PATENT DOCUMENTS
JP 58-044558 U 3/1983
(Continued)

OTHER PUBLICATIONS
International Search Report of PCT/JP2006/312096, date of mailing Aug. 1, 2006.
(Continued)

*Primary Examiner* — Thomas R Hannon
*Assistant Examiner* — Phillip A Johnson
(74) *Attorney, Agent, or Firm* — Westerman, Hattori, Daniels & Adrian, LLP (57) ABSTRACT

The present invention provides a screw device which takes a heavy load in one direction along the axis of the screw shaft and only a light load in the opposite direction, the screw device capable of providing ease of control of preloading.
The screw device of the present invention has a screw shaft 1 with an outer surface having a ball rolling groove 1a for rolling balls 7 and a roller rolling groove 1b for rolling rollers 6 both spirally formed thereon; a ball nut 4 with an inner surface having a ball rolling groove 4a spirally formed thereon facing the ball rolling groove 1a of the screw shaft 1; a roller nut 5 with an inner surface having a roller rolling groove 5a spirally formed thereon facing the roller rolling groove 1b of the screw shaft 1; a plurality of balls 7 arranged between the screw shaft 1 and the ball nut 4; and a plurality of rollers 6 arranged between the screw shaft 1 and the roller nut 5. The ball nut 4 and the roller nut 5 are connected along an axis of the screw shaft 1.

5 Claims, 5 Drawing Sheets

U.S. PATENT DOCUMENTS

| | | | |
|---|---|---|---|
| 4,896,552 A * | 1/1990 | Virga | 74/89.42 |
| 5,263,381 A * | 11/1993 | Shirai | 74/441 |
| 5,582,072 A | 12/1996 | Yamaguchi et al. | |
| 6,401,557 B1 | 6/2002 | Davies | |
| 2007/0028712 A1 * | 2/2007 | Teramachi et al. | 74/424.82 |
| 2009/0308192 A1 | 12/2009 | Lin et al. | |

FOREIGN PATENT DOCUMENTS

| | | | |
|---|---|---|---|
| JP | 044558 U | | 3/1983 |
| JP | 60161051 A | * | 8/1985 |
| JP | 05164210 A | * | 6/1993 |
| JP | 11257455 A | | 9/1999 |
| JP | 2001099256 A | | 4/2001 |
| JP | 2004138136 A | | 5/2004 |
| JP | 2005003179 A | | 1/2005 |
| SU | 486171 A | * | 1/1976 |
| SU | 700728 A | * | 12/1979 |

OTHER PUBLICATIONS

International Preliminary Report on Patentability (English translation form PCT/IPEA/409) of International Application No. PCT/JP2006/312096 with an international filing date of Jun. 16, 2006.

Office Action dated Feb. 20, 2009 issued on the corresponding Chinese patent Application No. 200680021086.X (with partial English translation).

Supplementary European Search Report dated Feb. 2, 2011, issued in corresponding European Patent Application No. 06757380.8.

* cited by examiner

SCREW DEVICE AND METHOD OF MANUFACTURING THE SAME

TECHNICAL FIELD

The present invention relates to a screw device having a screw shaft, a nut and rolling elements rotatably disposed therebetween.

BACKGROUND ART

A ball screw having balls movably deposited between a screw shaft and a nut has been in the actual use in various fields such as a positioning mechanism of a machine tool, a vehicle steering, a guide device, a motion screw and the like, since the ball screw enables reduction of a friction coefficient in rotating the screw shaft relative to the nut, as compared with a sliding contact-type screw. In the ball screw, the screw shaft has a spiral ball rolling groove formed thereon and the nut also has a ball rolling groove formed thereon. The ball rolling groove of the screw shaft and the ball rolling groove of the nut are aligned to form a path, in which a plurality of balls is arranged. In the nut, there is formed a circulation path for circulating the balls.

Meanwhile, recently in order to increase the allowable load, there is devised a roller screw using rollers as rolling elements, instead of balls, though the roller screw is not yet in the actual use. In this roller screw, the screw shaft has, instead of the ball rolling groove, a roller rolling groove formed thereon for rolling the rollers, and the nut also has a roller rolling groove formed thereon for rolling the rollers. As each of the rollers is in line contact with the roller rolling grooves, the allowable load of the roller screw can be made higher than that of the ball screw in which each ball is in point contact with the ball rolling grooves.

In use of a screw device, there is a case where the screw device bears a heavy load in one direction along the axis of the screw shaft and only as light a load as self weight in the opposite direction. For example, in an injection molding machine, when liquid (fluidized) resin is injected into a mold with any pressing device, a load of tens of tons is applied to a screw device in the axial direction. When the pressing device is pulled back, as small a load as the pressing device is only applied to the screw device. Also in a press machine, when a mold is pressed with high pressure against materials, a heavy load is applied to a screw device in the axial direction. However, when the mold is separated away from the materials, as small a load as the weight of the mold is only applied to the screw device.

When the screw device is used as one bearing a heavy load only in one direction along the axis of the screw shaft, the screw device cannot be a ball screw because in the ball screw, each ball is in point contact with the ball rolling grooves of the screw shaft and the nut and this point contact makes it difficult to increase the allowable load of the ball screw. On the other hand, the allowable load of the roller screw is allowed to be increased unlike the ball screw, and the roller screw is suitable for use as the screw device bearing a heavy load in one direction along the axis of the screw shaft.

There is known a screw device using both rollers and balls as rolling elements, in which two grooves are formed on each of the screw shaft and the nut, one groove for receiving rollers and the other groove, adjacent to the one groove, for receiving balls (see Patent document 1, paragraphs [0030]-[0033]). In this screw device, the rollers arranged in the one groove are subjected to a heavy "outward" load and the balls arranged in the other groove are subjected to a low "return" load.

[Patent document 1] Japanese Patent Laid-open Publication No. 2004-138136

DISCLOSURE OF THE INVENTION

Problems to be Solved by the Invention

In order to embody the roller screw, it is required to preload the rollers thereby to eliminate axial clearance between rollers (so-called "backlash"). In other words, it is necessary to arrange the rollers between the screw shaft and the nut in the state where they are slightly compressed. However, the rollers have the property of permitting only a small amount of elastic deformation, and with this property, the screw device disclosed in the patent document 1 presents a problem of difficulty in controlling preloading unless the roller rolling grooves are finished with high accuracy. Further, as the rollers are arranged in one of the two grooves and the balls are arranged in the other, the nut is likely to become longer. As the roller rolling groove of the nut needs to be machined by grinding with a grinding stone, if the nut becomes longer in the axial direction, the roller rolling groove of the nut may be hard to machine with high accuracy.

Then, the present invention has an object to provide a screw device which bears a heavy load in one direction along the axis of the screw shaft and a light load in the opposite direction, the screw device capable of providing ease of control of preloading and ease of machining of roller rolling grooves of the nut.

Means for Solving the Problems

The present invention will now be described below. In the followings, reference numerals appearing in the accompanying drawings may be added in brackets to components for easy understanding of the present invention, however this is not for limiting the present invention to the modes shown in the drawings.

In order to solve the above-mentioned problems, the invention of claim 1 is a screw device comprising: a screw shaft with an outer surface having a ball rolling groove and a roller rolling groove both spirally formed thereon; a ball nut with an inner surface having a ball rolling groove spirally formed thereon facing the ball rolling groove of the screw shaft; a roller nut with an inner surface having a roller rolling groove spirally formed thereon facing the roller rolling groove of the screw shaft; a plurality of balls arranged between the screw shaft and the ball nut; and a plurality of rollers arranged between the screw shaft and the roller nut, wherein the ball nut and the roller nut are connected along an axis of the screw shaft.

The invention of claim 2 is characterized in that, in the screw device according to claim 1, the rollers are parallel-arranged, each of the rollers is in contact with the roller rolling groove of the screw shaft and the roller rolling groove of the roller nut so as to bear a load in one direction along the axis of the screw shaft and not to bear a load in an opposite direction opposite to the one direction, and each of the balls is in contact with the ball rolling groove of the screw shaft and the ball rolling groove of the ball nut so as to bear the load in the opposite direction along the axis of the screw shaft.

The invention of claim 3 is characterized by, in the screw device according to claim 2, further comprising a shim interposed between the ball nut and the roller nut.

The invention of claim 4 is characterized in that, in the screw device according to any one of claims 1 to 3, the ball rolling groove and the roller rolling groove of the screw shaft have identical V-shaped cross sections, and the ball rolling groove of the ball nut and the roller rolling groove of the roller nut have identical V-shaped cross sections.

The invention of claim 5 is a method of manufacturing a screw device comprising the steps of: preparing a ball nut with an inner surface having a ball rolling groove spirally formed thereon facing a ball rolling groove of a screw shaft, fitting the ball nut to the screw shaft and arranging balls between the ball nut and the screw shaft; preparing a roller nut with an inner surface having a roller rolling groove spirally formed thereon facing a roller rolling groove of the screw shaft, fitting the roller nut to the screw shaft and arranging rollers between the roller nut and the screw shaft; and then connecting the ball nut and the roller nut along an axis of the screw shaft.

Effects of the Invention

According to the invention of claim 1, the plural rollers arranged in the roller nut are subjected to a heavy load in one direction along the axis of the screw shaft, and the balls arranged in the ball nut are subjected to a low load in the opposite direction along the screw shaft, and therefore, a screw device is obtained suitable for use in the case of bearing a heavy load in one direction of the screw shaft and a low load in the opposite direction. Further, as the ball nut with the balls arranged thereon and the roller nut with the rollers arranged thereon are connected in the axial direction, it is possible to charge the balls and the rollers with loads of their respective directions opposed to each other along the axis of the screw shaft. When the balls and the rollers are under the loads, the balls are elastically deformed much more than the rollers, which helps apply a compressive load to the rollers. In other words, control of preloading is facilitated. Furthermore, as compared with the conventional screw device having two grooves formed on each of the screw shaft and the nut, it is possible in the screw device of the present invention to reduce the axial length of the roller nut, thereby facilitating machining of the nut grooves.

According to the invention of claim 2, as the rollers are parallel-arranged, all the rollers arranged in a loaded roller rolling path bear a load in one direction along the axis of the screw shaft. Hence, it is possible to increase a difference in amount between the load in the one direction along the axis borne by the rollers and the load of the opposite direction borne by the balls.

According to the invention of claim 3, it is easy to provide such a contact structure as of the invention of claim 2 in which the rollers bear a load in one direction along the screw shaft and the balls bear a load in the opposite direction.

According to the invention of claim 4, as the ball rolling groove and the roller rolling groove have cross sections of identical shape, the balls and the rollers are both able to roll in the whole rolling grooves, thereby making the stroke of the nut longer.

According to the invention of claim 5, the plural rollers arranged in the roller nut are subjected to a heavy load in one direction along the axis of the screw shaft, and the balls arranged in the ball nut are subjected to a low load in the opposite direction along the screw shaft, and therefore, a screw device is obtained suitable for use in the case of bearing a heavy load in one direction of the screw shaft and a low load in the opposite direction. Further, as the ball nut with the balls arranged thereon and the roller nut with the rollers arranged thereon are connected in the axial direction, it is possible to charge the balls and the rollers with loads of their respective directions opposed to each other along the axis of the screw shaft. When the balls and the rollers are under loaded, the balls are elastically deformed much more than the rollers, which helps apply a compressive load to the rollers. In other words, control of preloading is facilitated. Furthermore, as compared with the conventional screw device having two grooves formed on each of the screw shaft and the nut, it is possible in the screw device of the present invention to reduce the axial length of the roller nut, thereby facilitating machining of the nut grooves. Furthermore, as the ball nut and the roller nut are connected after being fit to the screw shaft, assembling of the screw device is well facilitated.

DESCRIPTION OF REFERENCE NUMERALS 1, 11 . . . screw shaft
1a, 11a . . . ball rolling groove
1b, 11b . . . roller rolling groove
2, 15 . . . connecting nut
3, 13 . . . shim
4, 12 . . . ball nut
4a, 12a . . . ball rolling groove
5, 14 . . . roller nut
5a, 14a . . . roller rolling groove
6 . . . roller
7 . . . ball

BEST MODE FOR CARRYING OUT THE INVENTION

Figure 1:
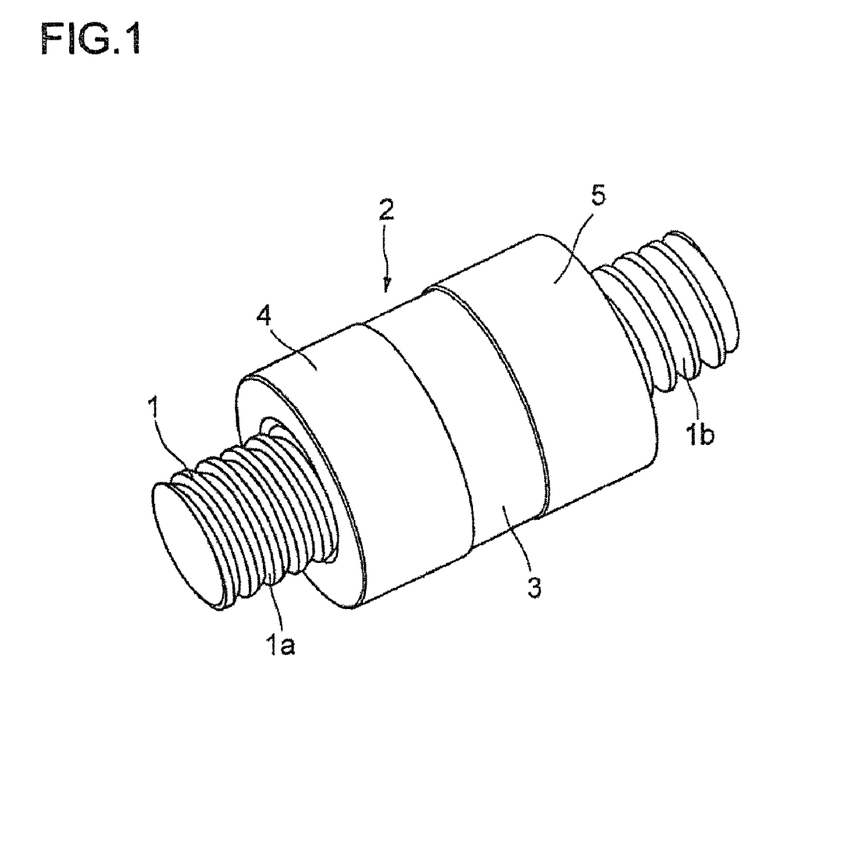
FIG. 1 is a perspective view of a screw device according to a first embodiment of the present invention.
Figure 2:
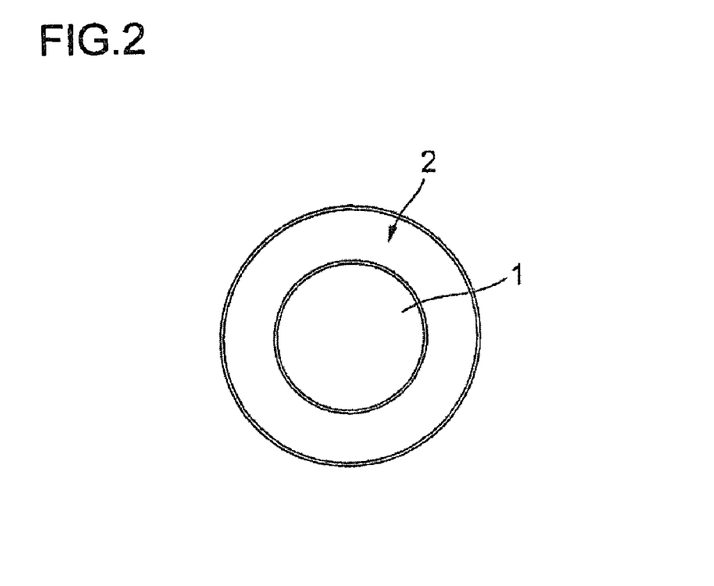
FIG. 2 is a front view of the above-mentioned screw device.
Figure 3:
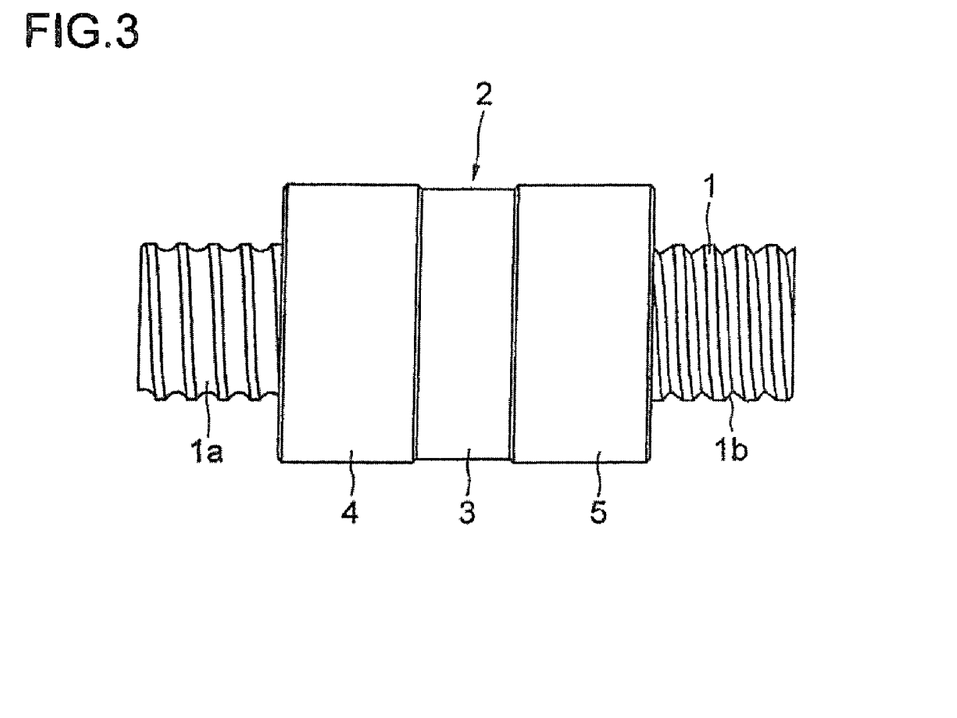
FIG. 3 is a lateral view of the above-mentioned screw device.

With reference to the attached drawings, the present invention will be described in detail below. FIGS. 1 to 3 each illustrate a screw device according to the first embodiment of the present invention. FIG. 1 is a perspective view of the screw device, FIG. 2 is a front view thereof and FIG. 3 is a lateral view thereof. In FIGS. 1 to 3, reference numeral 1 denotes a screw shaft, reference numeral 2 denotes a connecting nut. The connecting nut 2 is comprised of a ball nut 4 and a roller nut 5 connected by a shim 3.

The screw shaft 1 has a spiral ball rolling groove 1a formed for rolling balls and a roller rolling groove 1b formed for rolling rollers. The screw shaft 1 is divided along its axis into two, that is, a ball rolling groove area where the ball rolling groove 1a is only formed and a roller rolling groove area where the roller rolling groove 1b is only formed.

The ball nut 4 of the connecting nut 2 is provided facing the ball rolling groove 1a of the screw shaft 1, and the roller nut 5 of the connecting nut 2 is provided facing the roller rolling groove 1b of the screw shaft 1. The shim interposed between the ball nut 4 and the roller nut 5 is arranged at a joint portion between the ball rolling groove 1a and the roller rolling groove 1b. These ball nut 4, roller nut 5 and shim 3 are connected or joined into one piece by fastening means such as bolt, adhesion and the like. Like typical ball screws, when the screw shaft 1 of this screw device is rotated on its axis, the connecting nut 2 moves along the axis of the screw shaft by the screw action.

Figure 4:
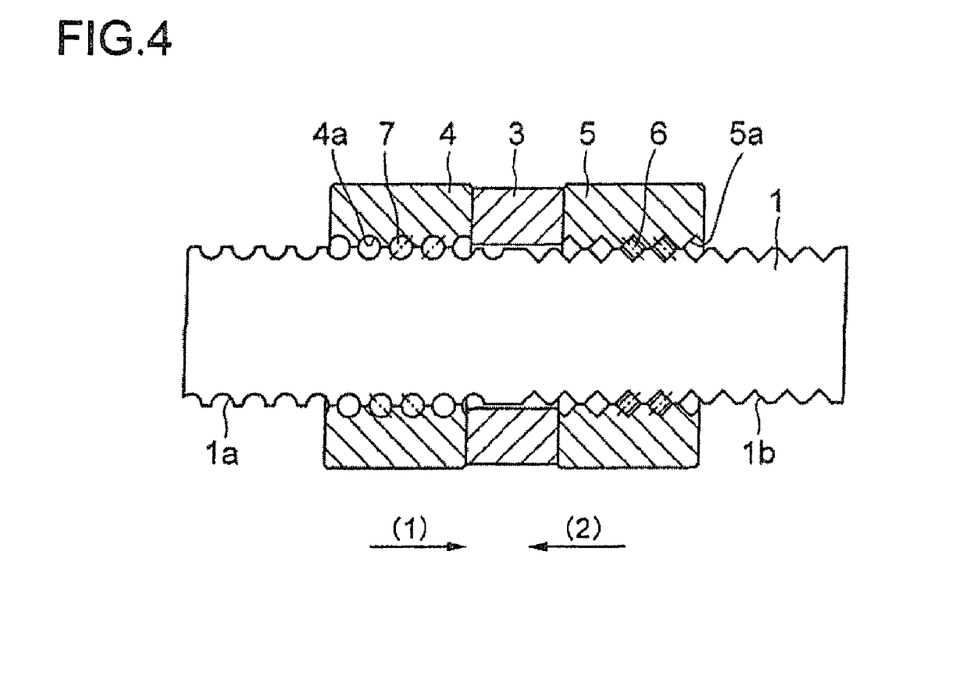
FIG. 4 is a cross sectional view of the screw device taken along the axis of the screw shaft.

FIG. 4 illustrates a cross section of a screw device. In the ball rolling groove area of the screw shaft 1, the ball rolling groove 1a is formed at a fixed lead. Also in the roller rolling groove area of the screw shaft 1, the roller rolling groove 1b is formed at a fixed lead. The lead of the ball rolling groove 1a and the lead of the roller rolling groove 1b are equal to each other. However, in this embodiment, the ball rolling groove 1a and the roller rolling groove 1b are different in cross-sectional shape. Specifically, the cross section of the ball rolling groove 1a is shaped like Gothic arch consisting of combined two circular arches. Meanwhile, the cross section of the roller rolling groove 1b is V-shaped so that each cylindrical roller 6 can roll in the groove. Balls 7 roll only in the ball rolling groove 1a and rollers 6 roll only in the roller rolling groove 1b. In order to make the stroke of the connecting nut 2 as long as possible, the ball rolling groove 1a and the roller rolling groove 1b are also formed on the screw shaft 1 positioned inside the shim 3.

The cross section of the ball rolling groove 4a of the ball nut 4 is shaped like Gothic arch composed of two circular arches, like the cross section of the ball rolling groove 1a of the screw shaft 1. Between the ball rolling groove 1a of the screw shaft 1 and the ball rolling groove 4a of the ball nut 4, there is a plurality of balls rotatably arranged.

Figure 5:
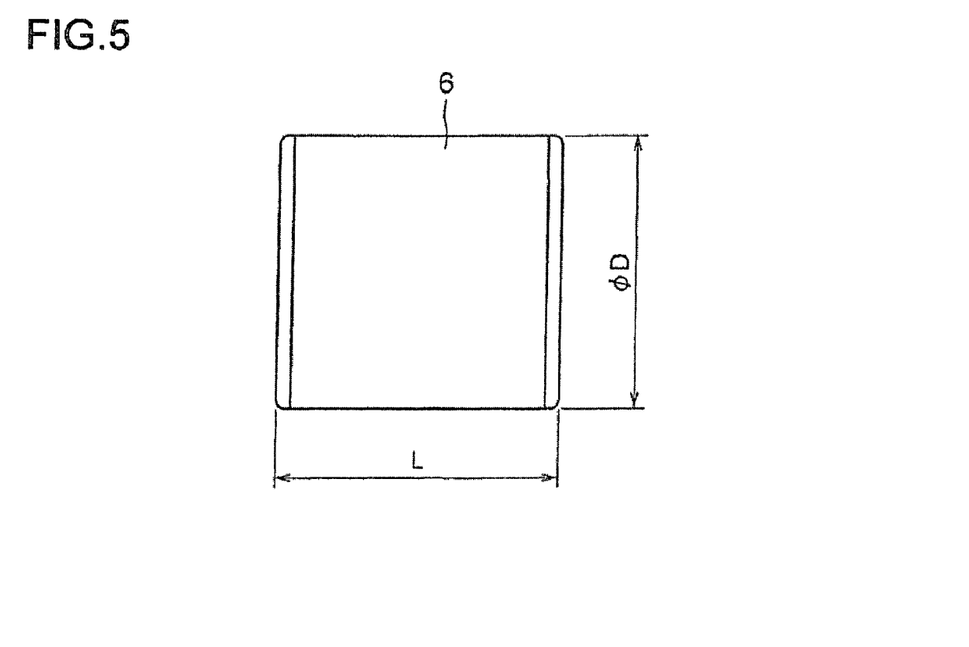
FIG. 5 is a lateral view of a roller.

The roller rolling groove 5a of the roller nut 5 has a V-shaped cross section, like the roller rolling groove 1b of the screw shaft 1, so that each cylindrical roller 6 can roll in the groove. Between the roller rolling groove 1b of the screw shaft 1 and the roller rolling groove 5a of the roller nut 5, there is a plurality of cylindrical rollers 6 arranged. As illustrated in FIG. 5, each roller 6 is shaped cylindrical and has a diameter and a height that are approximately equal to each other at a ratio of 1 to 1. Seen from the side, the roller 6 is shaped almost like a square. More specifically, the diameter □D of the roller 6 is slightly larger than the height L of the roller 6. Due to this size difference, when the roller is arranged in the roller rolling path of square-shaped cross section, the rolling surface of the roller 6 is in contact with the roller rolling grooves 1b and 5a and the side surfaces of the roller 6 are prevented from being in contact with the roller rolling grooves 1b and 5a. The plural rollers 6 are parallel-arranged in such a manner that every adjacent two of the rollers 6 have their axes aligned in parallel when seen in the moving direction of the rollers 6.

In this screw device, as illustrated in FIG. 4, the plural rollers 6 parallel-arranged on the roller nut 5 are subjected to a heavy load in one direction (1) along the axis of the screw shaft 1, while the plural balls 7 arranged on the ball nut 4 are subjected to a low load in the opposite direction (2) along the axis of the screw shaft 1.

In a loaded roller rolling path between the roller rolling groove 1b of the screw shaft 1 and the roller rolling groove 5a of the roller nut 5, the plural rollers 6 have their own axes crossing the axis of the screw shaft 1. As each of the rollers 6 is arranged in the loaded roller rolling path in such a way as to keep this attitude, strictly speaking, the axes of every adjacent two rollers are not parallel to each other. However, the axes of every adjacent two of the rollers 6 extend approximately in the same direction, when seen in the moving direction of the rollers.

As illustrated in FIG. 4, the shim 3 is arranged between the ball nut 4 and the roller nut 5. This shim 3 operates to offset the ball rolling groove 4a of the ball nut 4 and the roller rolling groove 5a of the roller nut 5 in their respective directions opposite to each other, relative to the ball rolling groove 1a and the roller rolling groove 1b, respectively, of the screw shaft 1. In other words, the ball rolling groove 4a of the ball nut 4 in phase with the ball rolling groove 1a of the screw shaft 1 is displaced leftward in the figure and the roller rolling groove 5a of the roller nut 5 in phase with the roller rolling groove 1b of the screw shaft 1 is displaced rightward in the figure. Once the shim 3 operates to offset the ball nut 4 and the roller nut 5, the balls 7 and the rollers 6 become preloaded.

Figure 6:
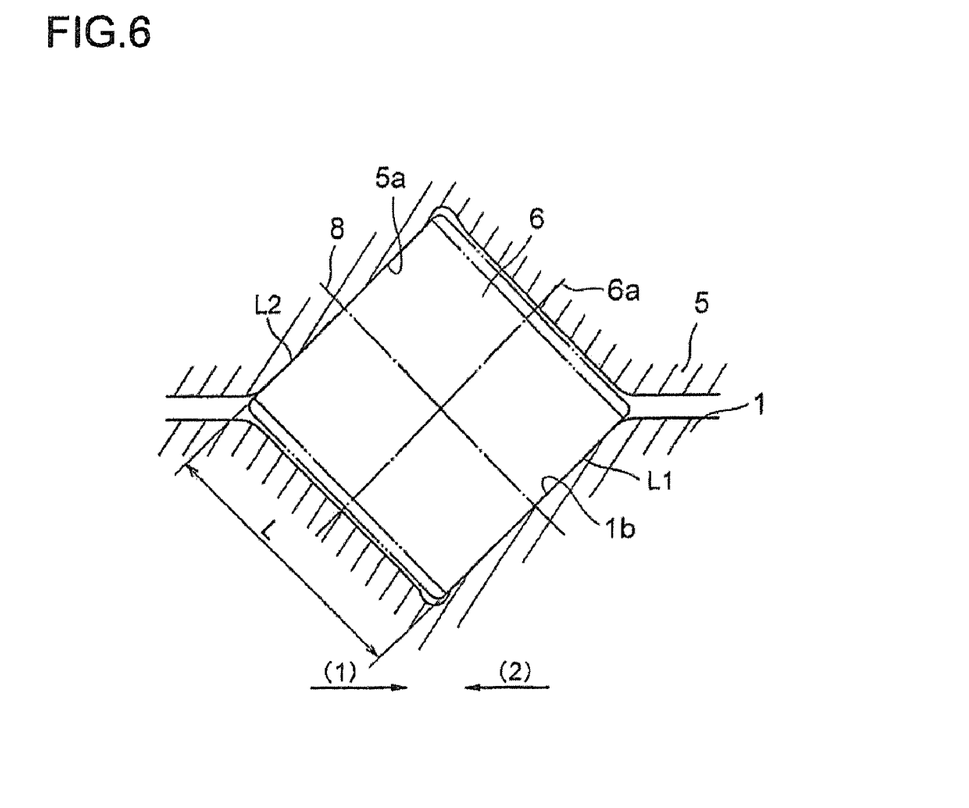
FIG. 6 is a view illustrating a roller arranged in the roller rolling groove.

In other words, as illustrated in FIG. 6, each of the plural rollers 6 arranged in parallel has its rolling surface compressed between the roller rolling groove 1b of the screw shaft 1 and the roller rolling groove 5a of the roller nut 5. The plural rollers 6 are in contact with the roller rolling grooves 1b and 5a of the screw shaft 1 and the roller nut 5, respectively, so that the rollers 6 bear the load in one direction (1) along the axis of the screw shaft 1 and do not bear the load in the opposite direction (2). Then, a contact angle line 8 perpendicular to both the contact line L1 of each roller 6 with the roller rolling groove 1b of the screw shaft 1 and the contact line L2 of the roller 6 with the roller rolling groove 5a of the roller nut 5 is perpendicular to the axis line 6a of the roller 6.

Figure 7:
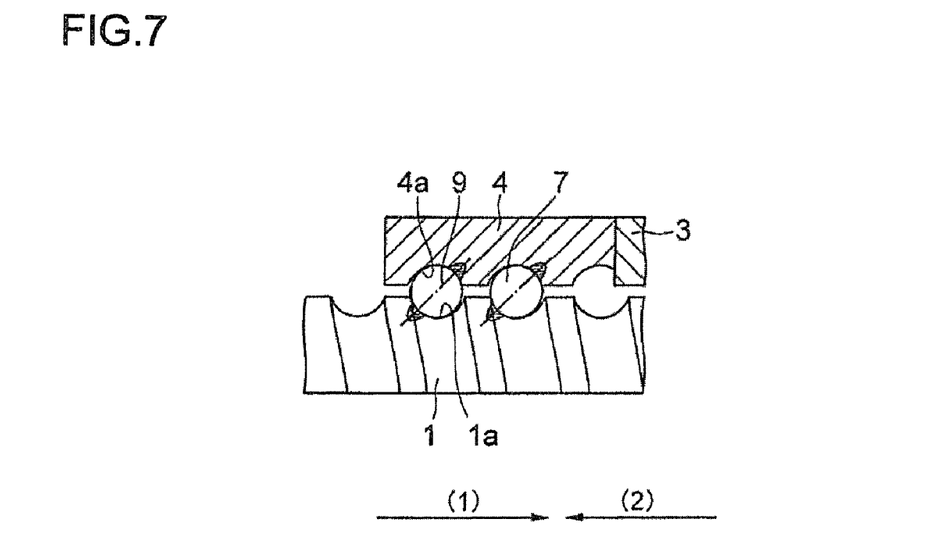
FIG. 7 is a view illustrating balls arranged in the ball rolling groove.

On the other hand, for the ball nut 4, as illustrated in FIG. 7, balls 7 are compressed between the ball rolling groove 4a of the ball nut 4 and the ball rolling groove 1a of the screw shaft 1. A contact angle line 9 connecting a contact point of each ball 7 with the ball rolling groove 1a of the screw shaft 1 to a contact point of the ball 7 with the ball rolling groove 4a of the ball nut 4 is presented as seen in FIG. 7. With this structure, the plural balls 7 bear the load in the opposite direction (2) along the axis of the screw shaft 1 and do not bear the load in the direction (1) along the axis of the screw shaft 1.

When the balls 7 and the rollers 6 are preloaded in their respective directions opposite to each other along the axis of the screw shaft 1, the balls 7 are elastically deformed more than the rollers 6. The rollers 6 permit only a small amount of elastic deformation and the rollers 6 are difficult to preload. However, the preloading of the rollers 6 can be made easier with use of elastic deformation of the balls 7.

According to the present embodiment where the ball nut 4 with the balls 7 arranged thereon and the roller nut 5 with the rollers 6 arranged thereon are connected along the axis of the screw shaft, it is possible to reduce the axial length of the roller nut 5, as compared with the conventional screw device in which two grooves are formed in each of the screw shaft and the nut, one groove receiving rollers and the other groove receiving balls. This reduction of the axial length facilitates grinding of the groove of the roller nut 5. Besides, as it is possible to form a single roller rolling groove 5a in the roller nut 5, greater design flexibility is advantageously achieved with respect to the lead and allowable load.

Next description is made about an assembling method of the screw device. First, the ball nut 4 is fit to the screw shaft 1, and balls 7 are arranged between the screw shaft 1 and the ball nut 4. Then, the roller nut 5 is fit to the screw shaft 1 with the shim 3 interposed between the ball nut 4 and the roller nut 5, and rollers 6 are arranged between the roller nut 5 and the screw shaft 1. Here, the order of fitting to the screw shaft 1 may be reversed between the ball nut 4 and the roller nut 5. Then, the ball nut 4, the shim 3 and the roller nut 5 are fastened to each other in the axial direction of the screw shaft 1 by fastening means such as bolts. Here, the shim 3 may be fastened in advance to the ball nut 4 or the roller nut 5.

In this assembling method, the ball nut 4 and the roller nut 5 are fit to the screw shaft 1 before being fastened to each other. This method makes assembling of the screw device easier.

Figure 8:
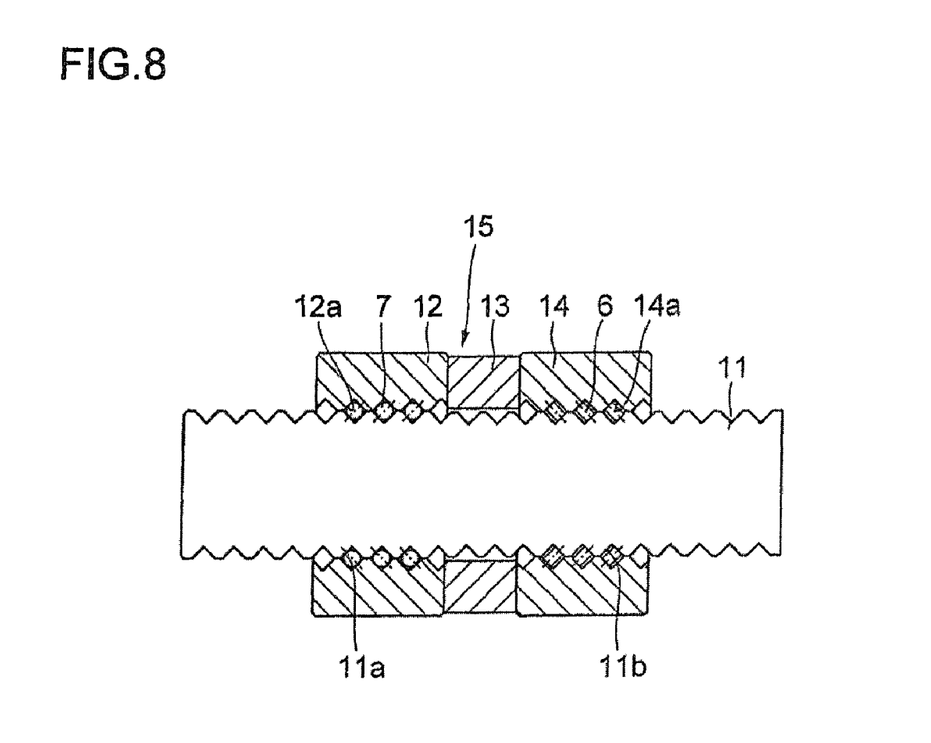
FIG. 8 is a cross sectional view of a screw device according to a second embodiment of the present invention.

FIG. 8 is a cross sectional view of a screw device according to the second embodiment of the present invention. In this embodiment, a ball rolling groove 11a and a roller rolling groove 11b of a screw shaft 11 have the same cross sections of V shape. The ball rolling groove 11a and the roller rolling groove 11b are continuously formed at a fixed lead. A ball rolling groove 12a of a ball nut 12 and a roller rolling groove 14a of a roller nut 14 also have V-shaped cross sections. Between the ball nut 12 and the roller nut 14, a shim 13 is interposed to offset them in the respective directions opposite to each other, as is the case with the screw device of the above-described first embodiment. Accordingly, contact structure of balls 7 and rollers 6 with the rolling grooves is the same as that of the first embodiment.

Like in this embodiment, even if the ball rolling groove 12a is formed to have a V-shaped cross section, the balls 7 can move in the ball rolling grooves 11a and 12a smoothly. When the ball rolling groove 11a and the roller rolling groove 11b have cross sections of identical shape, the balls 7 and the rollers 6 are both able to roll in both the ball rolling grooves 11a, 12a and the roller rolling grooves 11b and 14a, and therefore, the stroke of a connecting nut 15 is allowed to be longer. However, as compared with the Gothic-arch-shaped grooves, caution is required for stress concentration because the balls 7 are likely to be in point contact with the ball rolling grooves 11a and 12a when the grooves have v-shaped cross sections.

Figure 9:
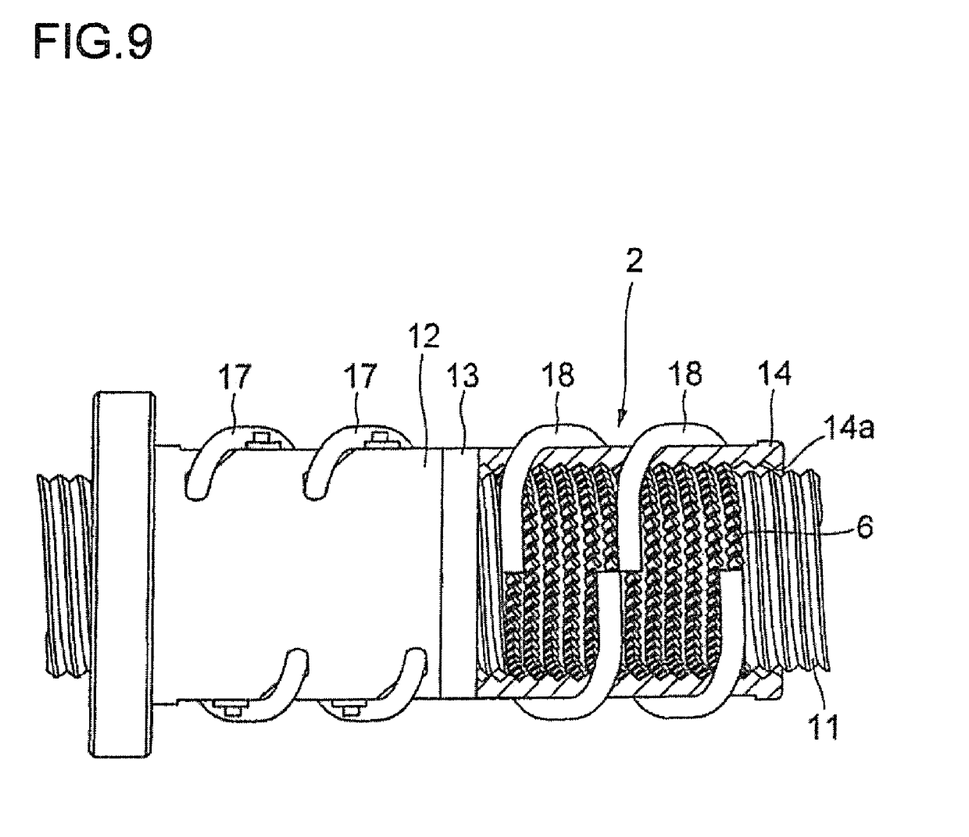
FIG. 9 is a cross sectional view of a screw device according to a third embodiment of the present invention.

FIG. 9 illustrates a screw device according to the third embodiment of the present invention. In this embodiment, the ball nut 12 and the roller nut 14 are provided with pipe-shaped circulation members 17 and 18, respectively, for circulating balls or rollers. As the screw shaft 11, the ball nut 12, the shim 13 and the roller nut 14 are structured in the same manner as those of the screw device of the above-described second embodiment, the like reference numerals refer to like parts and their explanation is omitted. The circulation member 17 picks up each ball 7 which has rolled up to one end of the ball rolling groove 12a of the ball nut 12 and returns the ball 7 several turns back to the other end of the ball rolling groove 12a. Meanwhile, the circulation member 18 picks up each roller 6 which has rolled up to one end of the roller rolling groove 14a of the roller nut 14 and returns the roller 6 several turns back to the other end of the roller rolling groove 14a. With the pipe-shaped circulation members provided, the balls 7 and the rollers 6 are allowed to circulate endlessly and the stroke of the connecting nut 2 can be lengthened.

Here, between rollers 6 or balls 7, there may be provided a spacer for preventing the rollers 6 or balls 7 from coming into contact with each other. Besides, instead of the pipe-shaped circulation members 17 and 18, there may be provided end-cap type circulation members or deflector type circulation members. Each end cap type circulation member consists of a pipe path passing through the nut in the axial direction and a direction change path attached to each end face of the nut. Each deflector type circulation member is formed into "piece" (wedge) shape and operates in such a manner that each rolling element rolling in the rolling groove of the screw shaft is brought over the screw thread to return one turn back into the rolling groove.

The present invention is not limited to the above-described embodiments and may be embodied in various forms without departing from the scope of the present invention. For example, the ball nut and the roller nut may be directly joined or connected to each other with no shim interposed therebetween so that the balls and the rollers are preloaded. Besides, each roller is not limited to a cylindrical roller and may be a taper roller of conical shape. Further, the number of threads of the screw shaft may be changed depending on the amounts of the loads and lead length. Further, the cross-sectional shape of the ball rolling groove is not limited to the Gothic arch groove shape consisting of combined two circular arches and may be circular arch groove shape consisting of a single arch.

The present specification is based on Japanese patent application No. 2005-177419 filed on Jun. 17, 2005, entire contents of which are incorporated by reference herein.

The invention claimed is:

1. A screw device comprising:
    a screw shaft with an outer surface having a ball rolling groove and a roller rolling groove both spirally formed thereon;
    a ball nut with an inner surface having a ball rolling groove spirally formed thereon facing the ball rolling groove of the screw shaft;
    a roller nut with an inner surface having a roller rolling groove spirally formed thereon facing the roller rolling groove of the screw shaft;
    a plurality of balls arranged between the screw shaft and the ball nut; and
    a plurality of rollers arranged between the screw shaft and the roller nut,
    wherein the ball nut and the roller nut are connected along an axis of the screw shaft.

2. The screw device according to claim 1, wherein
    the rollers are parallel-arranged,
    each of the rollers is in contact with the roller rolling groove of the screw shaft and the roller rolling groove of the roller nut so as to bear a load in one direction along the axis of the screw shaft and not to bear a load in an opposite direction opposite to the one direction, and
    each of the balls is in contact with the ball rolling groove of the screw shaft and the ball rolling groove of the ball nut so as to bear the load in the opposite direction along the axis of the screw shaft.

3. The screw device according to claim 2, further comprising a shim interposed between the ball nut and the roller nut.

4. The screw device according to any one of claims 1 to 3, wherein
    the ball rolling groove and the roller rolling groove of the screw shaft have identical V-shaped cross sections, and
    the ball rolling groove of the ball nut and the roller rolling groove of the roller nut have identical V-shaped cross sections.

5. A method of manufacturing a screw device comprising the steps of:
    preparing a ball nut with an inner surface having a ball rolling groove spirally formed thereon facing a ball rolling groove of a screw shaft, fitting the ball nut to the screw shaft and arranging balls between the ball nut and the screw shaft;
    preparing a roller nut with an inner surface having a roller rolling groove spirally formed thereon facing a roller rolling groove of the screw shaft, fitting the roller nut to the screw shaft and arranging rollers between the roller nut and the screw shaft; and
    then connecting the ball nut and the roller nut along an axis of the screw shaft.

* * * * *